US007965646B2

(12) United States Patent
Casey

(10) Patent No.: US 7,965,646 B2
(45) Date of Patent: Jun. 21, 2011

(54) WIRELESS CODE-PASSING SYSTEM FOR STATEFUL CONNECTION MONITORING

(75) Inventor: Steven M. Casey, Littleton, CO (US)

(73) Assignee: Qwest Communications International Inc, Denver, CO (US)

(*) Notice: Subject to any disclaimer, the term of this patent is extended or adjusted under 35 U.S.C. 154(b) by 1636 days.

(21) Appl. No.: 10/916,725

(22) Filed: Aug. 11, 2004

(65) Prior Publication Data
US 2006/0034196 A1 Feb. 16, 2006

(51) Int. Cl.
*H04L 12/26* (2006.01)
(52) U.S. Cl. ........... 370/241.1; 370/242; 370/248; 370/310; 709/224; 455/67.11; 455/423; 455/421
(58) Field of Classification Search ............ 370/241, 370/241.1, 242, 310, 328, 338, 480, 491, 370/496, 498, 500, 410, 216, 313, 314, 320, 370/321, 335, 336, 350, 441, 442, 352, 245, 370/247, 248, 251–253, 310.2, 333, 346; 455/403, 422.1, 423, 66.1, 503, 9, 67.11, 455/115.1, 421; 704/212; 379/90.01; 726/26; 709/224, 248; 714/748–749
See application file for complete search history.

(56) References Cited

U.S. PATENT DOCUMENTS

| | | | | |
|---|---|---|---|---|
| 4,703,480 A * | 10/1987 | Westall et al. | ............... | 704/212 |
| 5,327,581 A * | 7/1994 | Goldberg | ............... | 455/503 |
| 5,745,502 A * | 4/1998 | Khayrallah et al. | ............... | 714/751 |
| 5,799,244 A * | 8/1998 | Matsumoto | ............... | 455/67.13 |
| 5,809,414 A * | 9/1998 | Coverdale et al. | ............... | 455/421 |
| 5,943,628 A * | 8/1999 | Barrett et al. | ............... | 455/67.11 |
| 6,069,874 A * | 5/2000 | Morishima | ............... | 370/242 |
| 6,178,173 B1 * | 1/2001 | Mundwiler et al. | ............... | 370/410 |
| 6,349,199 B1 * | 2/2002 | Armantrout | ............... | 455/67.11 |
| 6,360,271 B1 * | 3/2002 | Schuster et al. | ............... | 709/231 |
| 6,363,056 B1 * | 3/2002 | Beigi et al. | ............... | 370/252 |
| 6,532,279 B1 * | 3/2003 | Goodman | ............... | 379/90.01 |
| 6,535,991 B1 * | 3/2003 | Gallant et al. | ............... | 709/224 |
| 6,867,965 B2 * | 3/2005 | Khoo | ............... | 361/686 |
| 7,076,245 B1 * | 7/2006 | Satapathy | ............... | 455/67.11 |
| 7,120,122 B1 * | 10/2006 | Starr et al. | ............... | 370/252 |
| 7,206,305 B2 * | 4/2007 | Preston et al. | ............... | 370/352 |
| 7,233,788 B2 * | 6/2007 | Kedem | ............... | 455/414.1 |
| 7,369,537 B1 * | 5/2008 | Kirchhoff et al. | ............... | 370/352 |
| 2002/0045445 A1 * | 4/2002 | Higuchi | ............... | 455/425 |
| 2002/0060997 A1 * | 5/2002 | Hwang | ............... | 370/335 |
| 2003/0013441 A1 | 1/2003 | Bhogal et al. | | |
| 2003/0022628 A1 * | 1/2003 | Mamiya et al. | ............... | 455/67.1 |
| 2003/0086399 A1 * | 5/2003 | Proctor, Jr. | ............... | 370/335 |
| 2004/0066741 A1 * | 4/2004 | Dinker et al. | ............... | 370/216 |
| 2004/0085894 A1 * | 5/2004 | Wang et al. | ............... | 370/216 |
| 2004/0092278 A1 | 5/2004 | Doodley | | |
| 2004/0230820 A1 * | 11/2004 | Hui Hsu et al. | ............... | 726/26 |
| 2005/0050398 A1 * | 3/2005 | Rao et al. | ............... | 714/39 |
| 2005/0073402 A1 * | 4/2005 | Denyer | ............... | 709/224 |
| 2006/0025122 A1 * | 2/2006 | Harris et al. | ............... | 455/419 |
| 2007/0058599 A1 * | 3/2007 | Harsch | ............... | 370/338 |

* cited by examiner

*Primary Examiner* — Kwang B Yao
*Assistant Examiner* — Jeffrey M Rutkowski

(57) ABSTRACT

A stateful connection is monitored between wireless communications devices. A first code packet is generated at a first wireless communications device. The first code packet is transmitted from the first wireless communications device to a second o wireless communications device. A determination is made whether a second code packet generated by the second wireless communications device in response to receipt of the first code packet is received by the first wireless communications device within a predetermined time.

22 Claims, 3 Drawing Sheets

WIRELESS CODE-PASSING SYSTEM FOR STATEFUL CONNECTION MONITORING

BACKGROUND OF THE INVENTION

This application relates generally to wireless devices. More specifically, this application relates to passing a wireless code for stateful connection monitoring.

One of the most frustrating aspects of current wireless systems is the inability for parties to a stateless connection to easily identify when the connection is dropped. Current wireless systems typically function by having the wireless device communicate with a tower, with signal strength being derived from the tower. When a connection between two wireless devices is in state, communication is from each device to the tower, leading to the possibility that the connection may be dropped while one of the devices has full coverage, even though the other device has no coverage. Identifying that the connection has been dropped essentially amounts to each of the parties waiting until they notice that no response is being received.

This is manifested in particular with cellular telephones, in which parties are conducting a conversation with transmissions being routed through a cellular network. When one of the parties fails to respond to part of the conversation, it is unclear whether there has been a disruption in the connection or that the party has simply not responded. This frequently leads to inquiries by each of the parties whether they can still be heard, with still the only confirmation that the connection has been dropped being a lack of response. The problem is sufficiently pervasive with wireless systems that it is frequently satirized. While such satire is sometimes amusing, it does underscore the pervasiveness of the problem and the frustration experienced by the parties in having no simple way to identify the loss of a stateful connection.

There is accordingly a general need in the art for methods and systems providing for improved monitoring of stateful connections in wireless systems.

BRIEF SUMMARY OF THE INVENTION

Embodiments of the invention provide a method for monitoring a stateful connection between wireless communications devices. A first code packet is generated at a first of the wireless communications devices. The first code packet is transmitted from the first of the wireless communications devices to a second of the wireless communications devices. A determination is made whether a second code packet generated by the second of the wireless communications devices in response to receipt of the first code packet is received by the first of the wireless communications devices within a predetermined time after transmission of the first code packet from the first of the wireless communications devices.

In some such embodiments, the first code packet is packaged with a communications signal, and the first code packet is transmitted by transmitting the packaged communications signal and first code packet. Similarly, the second code packet may be received as part of a communications signal. In such instances, the second code packet is filtered from the communications signal and the filtered communications signal is transmitted to a speaker for conversion to an acoustic signal. If the second code packet is not received, an audible alert may be generated to indicate a potential degradation in the stateful connection.

In some instances the generation of a first code packet, transmission of the first code packet, and determination whether a second code packet is received are repeated sequentially for a duration of the stateful connection. If there is a failure in receiving the second code packet during the sequential repetition, an audible alert may be generated. Generation of the audible alert may comprise determining a level for the audible alert in accordance with a defined priority state for the stateful connection. In one embodiment, the first code packet includes a time stamp identifying its time of transmission from the first of the wireless communications devices, and the second code packet similarly includes a time stamp identifying its time of transmission from the second of the wireless communications devices.

Each of the first and second wireless communications devices may be a cellular device, such as a cellular telephone, in an embodiment. In such instances, transmission of the first code packet may be performed over a cellular network. The first and second code packets may have frequencies greater than about 4 kHz. In one embodiment, the first and second code packets have frequencies substantially in the range of 4-8 kHz.

Methods of the invention may be embodied in a wireless communications device that includes a wireless transmitter, a wireless receiver, a timer, and a processor. The wireless transmitter is adapted to convert electrical signals into radiating electromagnetic signals. The wireless received is adapted to convert received electromagnetic signals into electrical signals. The timer is adapted to provide a standardized measure of time intervals. The processor is in electrical communication with the wireless transmitter, the wireless receiver, and the timer and includes instructions for operating the wireless communications device to monitor a stateful connection.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention provide methods for monitoring a stateful connection between wireless communications devices, and wireless communications devices that have such a capability. As used herein, a "stateful" connection is a connection between a plurality of devices in which some information about the connection is retained for future use. In some instances, the connection is kept open even though neither of the two devices is at that moment transmitting information, i.e. the connection itself retains state. A stateful connection may be illustrated by considering a cellular-telephone connection. During a typical connection, there may be conversation back and forth between parties, with the connection remaining in state when either party is speaking, when both are speaking, or even when neither is speaking. When in state, information about the connection is continuously retained to permit the exchange to continue. This may be contrasted with a stateless connection in which no information is retained so that information is simply transmitted from a sender to a receiver without any prior connection setup or any expectation of an acknowledgment of receipt.

Embodiments of the invention monitor a stateful connection established between a plurality of wireless communications devices by sequentially exchanging a code packet back and forth between the devices. The exchange of the code is device-to-device as opposed to device-to-tower. The code packet is provided as an in-band signal so that there is no need to upgrade the network used in performing the code exchange. A disruption in the stateful connection is detected by a delay in receipt of the returned code, or by no receipt of it at all. More generally, analysis of delivery delay, jitter, losses, and the like associated with exchange of the code packet between the devices may be used to identify disruptions in the stateful connection. When disruptions are thus detected or identified, an audible alert may be provided on the device to warn a user of the disruption.

Figure 1:
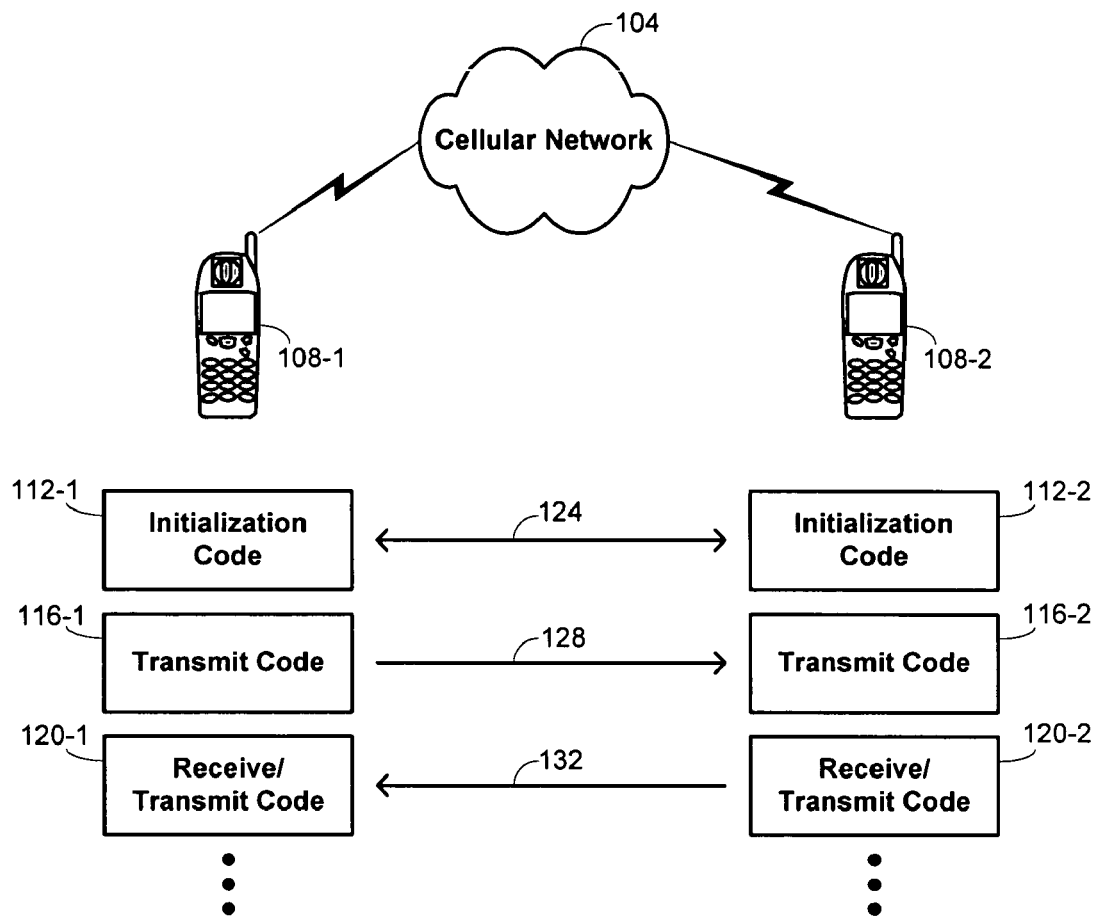
FIG. 1 is a schematic illustration of a device-to-device code-passing arrangement used in monitoring stateful connections in wireless systems.

An overview of embodiments of the invention is provided schematically with FIG. 1 for the particular example where the wireless communications devices comprise handheld cellular telephones 108. In other embodiments, the same principles may be used to monitor stateful connections between other wireless communications devices. The stateful connection is maintained through a network 104, shown in FIG. 1 to comprise a cellular network. When the stateful connection is initiated, an initialization code 112 is exchanged between the two devices. After establishment of the connection, the initiating device generates and transmits a code packet 116 from the first device 108-1 to the second device 108-2. Receipt of the code packet confirms for the second device 108-2 that the stateful connection is maintained, and also prompts the second device 108-2 to generate and transmit a code 120 back to the first device 108-1. Receipt of this code by the first device 108-1 confirms for the first device that the stateful connection is maintained, and also prompts the first device 108-1 to generate and transmit a further code back to the second device 108-2. This sequential exchange of codes proceeds indefinitely while the stateful connection is maintained, providing each of the devices 108 with information that indicates the status of the stateful connection.

It is not necessary that the stateful connection be characterized merely as maintained or not. In other embodiments, greater analysis may be performed on the signal to identify more detailed characteristics of the status of the stateful connection. This is aided in certain embodiments by including a time stamp as part of the code packet. One exemplary packet 200 shown in FIG. 2 comprises a code-type field 204, a time-stamp field 208, and a code-number field 212. By including a time stamp at the device where the code packet 200 is generated, the device that receives the code packet 200 may determine whether there are transmission delays that reflect a degradation of the connection. Determination of transmission delays may be performed by comparing time differences between successive code receipts to account for the fact that timers in the two devices may not be synchronized. Partial losses may be identified when the time interval between receipt of successive codes exceeds a predetermined value that generally corresponds to a maximum potential time difference consistent with normal transmission.

Figure 3:
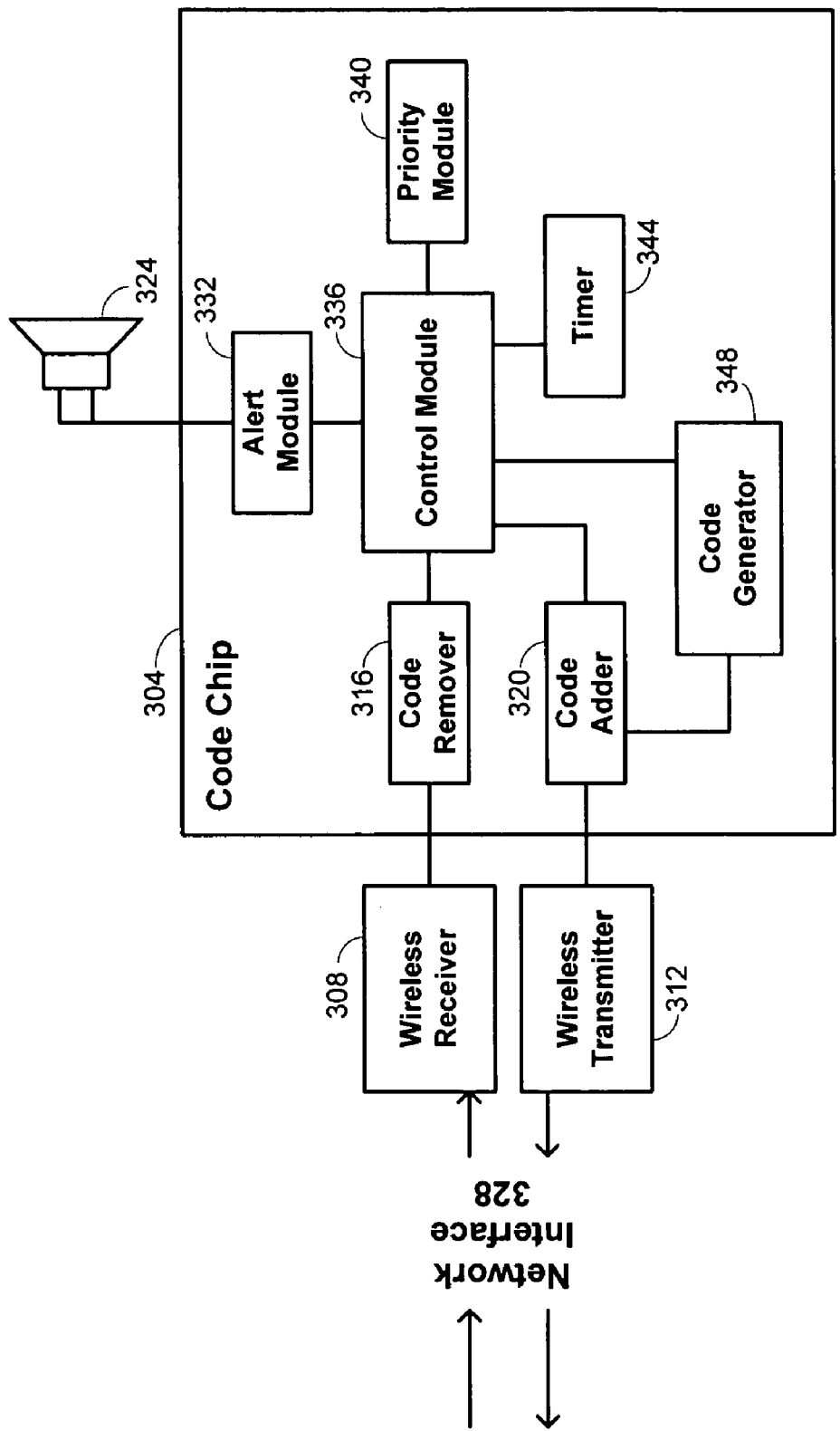
FIG. 3 is a schematic illustration of a structure used in implementing the code-passing arrangement of FIG. 1 in some embodiments.

In implementing the code-passing between wireless devices, a code chip may be provided within the wireless devices as depicted in schematic form for one embodiment in FIG. 3. The code chip 304 may be interfaced with other components that generally exist within wireless devices, such as a wireless receiver 308, wireless transmitter 312, and speaker 324, but may otherwise be accommodated with virtually any design for wireless devices, acting as an additional component to such devices. The code chip 304 adds functionality to the wireless device, which otherwise is configured as known in the art for the transmission and receipt of communications signals during a stateful connection with another wireless device. The code chip 304 includes a control module 336 that is interfaced with a number of other modules. The control module 336 includes instructions that implement the generation, transmission, receipt, and analysis of the code packet, as well as that determine and implement responses to characteristics of received code packets. These instructions may be provided in the form of software, hardware, and/or firmware, or combinations thereof, in different embodiments. It is a matter of routine skill in the art to implement the instructions in these different forms.

Figure 2:
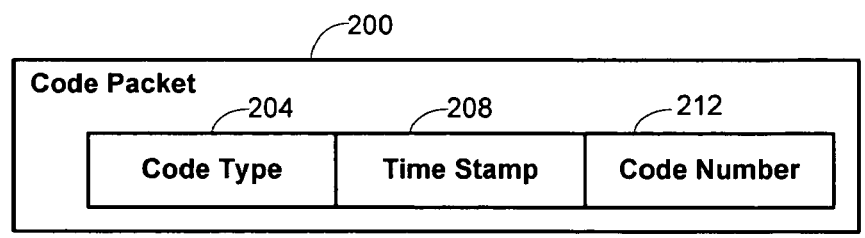
FIG. 2 is a schematic illustration of a code that is used in one embodiment of the code-passing arrangement of FIG. 1.

The control module 336 may thus include a connection with a code-generator 348 module for generating the code packet, such as with the structure shown in FIG. 2. In embodiments where the code packet includes a time stamp, timing information may be obtained by the control module 336 from a timer module 334 also provided in communication with the control module 336. To send the generated code packet in-band, a code-adder module 320 may be provided that packages the generated code packet with a communications signal that is being transmitted by the wireless device through the stateful connection. For example, in the case of a cellular telephone, the communications signal may be a digitized voice signal that is transmitted during the stateful connection with another cellular telephone; the code is then packaged with the digitized voice signal for transmission through a network interface 328 by the wireless transmitter.

When codes are being exchanged between wireless communications devices, the signal received through the network interface 328 may thus also at times comprise a code packaged with the communications signal. A code remover 316 in electrical communication with the wireless receiver 308 may thus be used to detect receipt of the code and to strip the code from the communications signal before it is transmitted to the speaker 324. In addition, because of the manner in which communications take place, multiple packets may be received, in which case extra packets are simply discarded.

Use of the code remover 316 advantageously permits the code to be provided in the range of 4-8 kHz, which is above the normal human speaking range of 100 Hz-3500 Hz, but still within the normal human hearing range of about 20 Hz-20 kHz. If the code is provided within the normal human hearing range, but not removed from the communications signal before transmission to the speaker 324, it will be audible to users of the wireless communications device. Identification of the presence or absence of the code is simplified by providing it in a frequency range outside the normal human speaking range so that it is clearly distinct from voice signals that form part of the received communications signal. It is possible in some alternative embodiments to provide the signal at any frequency greater than 4 kHz. If the signal is provided at a frequency outside the normal human hearing range, say at >20 kHz, treatment of received communications signals may be simplified since there is no need to remove the code from the communications signal before it is transmitted to the speaker 324. A potential risk with providing the signal outside the normal human hearing range is that the communications network over which signals are exchanged may be configured to filter signals outside the normal human hearing range. Providing the code packet at a frequency that is within the normal human hearing range has the advantage of not requiring any modification to an existing communications network used for the transmission.

The alert module 332 is used to provide an audible alert over the speaker 324 when lack of receipt of the code is identified as corresponding to a degradation or loss in the stateful connection. In some instances, the form of the alert and even whether it is provided may depend on a priority setting established by a user through the priority module 340. The priority module 340 translates a defined priority state into tolerance levels that are used in determining whether to provide the audible alert. For example, some uses of the wireless communications device may be designated as high priority by a user, such as when a cellular telephone is to be used for a critically important call. The priority module 340 is configured to interpret such a high-priority designation as using very low tolerance levels in evaluating deviations from expected receipt of the code. If a code is not received when expected within those low tolerance levels, the control module 336 causes the alert module 332 to generate an alert so that the user is aware of even slight degradations in the stateful connection. If the use is instead designated as a low priority by the user, such as when a cellular telephone is to be used for a casual call, the priority module 340 uses much higher tolerance levels in evaluating code absences or delays. For instance, the priority module 340 might allow multiple code receipts to be missed before initiating an alert, or allow for greater transmission delays. In some instances, an alert is provided only once the behavior is outside the higher tolerance levels. In other instances, a graduated system of alerts may be provided so that a minor warning alert is generated when behavior is outside low tolerances, but a more demanding alert is provided when behavior is outside even the higher tolerance levels. While some embodiments may use only two distinct priority levels, other embodiments may use three, four, or even more priority levels, dependent in part on the variety of different types of communications that may be performed with the wireless communications device.

Figure 4:
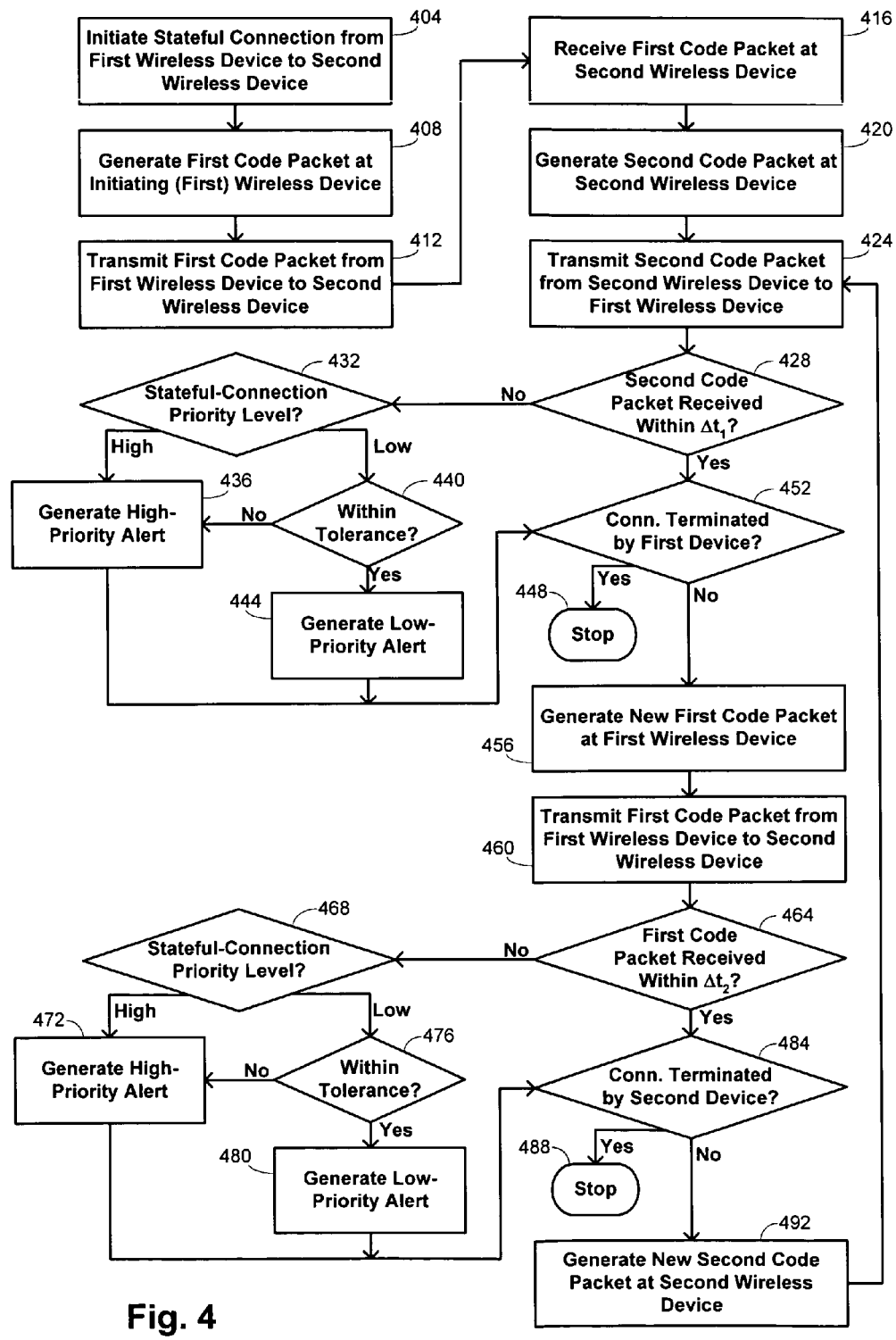
FIG. 4 is a flow diagram illustrating methods for monitoring a stateful connection between wireless communications systems in embodiments of the invention.

Various aspects of embodiments of the invention are summarized with the flow diagram of FIG. 4, which summarizes methods for monitoring stateful connections, and which may be performed in some embodiments using the structure described in connection with FIG. 3. The methods begin at block 404 by initiating a stateful connection from a first wireless device to a second wireless device, such as in response to a cellular-telephone user calling another cellular-telephone user. Once the stateful connection has been initiated, a first code packet is generated at the initiating wireless device at block 408 as described above, and is transmitted to the second wireless device at block 412. The first code packet is received at the second wireless device at block 416. In response, a second code packet is generated at the second wireless device at block 420 and transmitted back to the first wireless device at block 424. The stability of the wireless connection is reflected by an indefinite exchange of such codes back and forth between the devices.

At block 428, a check is made at the first wireless device whether the second code packet has been received within an expected time $\Delta t_1$ from transmission of the first code packet from the first wireless device. The time comparison is made by recording a time of transmission for the first wave packet such as with a timer module as described above. A failure to receive the second wave packet within the expected time $\Delta t_1$ indicates a degradation in the stateful connection. The response to such a degradation may depend on a priority level established by a user for the stateful connection. Merely by way of example, FIG. 4 indicates two possible priority levels and illustrates potential responses, but such an illustration is not intended to be limiting. If the priority level has been set to "high," as checked at block 432, a high-priority alert is generated at block 436 in the form of an audible signal. If the priority level has been set to "low," a check is made at block 440 whether the degradation of the stateful connection is within certain predefined tolerance levels, perhaps based on past failures to receive code packets, past delays to receive code packets, and the like. If the degradation is outside the tolerance limits, a high-priority alert is generated at block 436, but if the degradation remains within the tolerance levels, only a low-priority alert is generated at block 444.

In any event, the method continues at block 452 with a check whether the stateful connection has been terminated by the first device, such as by a user of a cellular telephone terminating a call. If the connection has been terminated, the method stops at block 448, but otherwise continues at block 456 by generating a new first code packet at the first wireless device. Like the previous first code packet, the new first code packet is transmitted from the first wireless device to the second wireless device at block 460. The second wireless device then performs a similar type of analysis as was performed at the first wireless device. Namely, at block 464 a check is made whether the first code packet has been received within a time $\Delta t_2$ of transmission of the previous second code packet from the second wireless device. If not, an alert may be generated in a fashion similar to that at the first wireless device depending on a user-defined priority level for the stateful connection, as checked at block 468. The priority level used by the second wireless device and checked at block 468 may be different from the priority level used by the first wireless device and checked at block 432, reflecting the fact that different users may assign different priority levels to the same stateful connection. If the priority level is "high," a high-priority alert is generated at block 472. If the priority level is "low," a check is made at block 476 whether the identified degradation in the stateful connection is within a predefined tolerance level, a high-priority alert being generated at block 472 if it is not and a low-priority alert being generated at block 480 if it is.

Further reflecting the general symmetry of operations at the wireless communications devices, a check is made at block 484 whether the stateful connection has been terminated at the second wireless device, such as by the user of that device terminating a cellular-telephone call. If so, the method stops at block 488, but otherwise continues with generation of a new second code packet at the second wireless device as indicated in block 492. This second code packet is transmitted back to the first wireless device at block 424, with the process continuing indefinitely until the stateful connection is lost or deliberately terminated by one or both of the wireless communications devices.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for monitoring a stateful connection between wireless communications devices, the method comprising:
generating a first code packet at a first of the wireless communications devices;
transmitting the first code packet from the first of the wireless communications devices to a second of the wireless communications devices;
determining whether a second code packet generated by the second of the wireless communications devices in response to receipt of the first code packet is received by the first of the wireless communications devices within a predetermined time after transmission of the first code packet from the first of the wireless communications devices, wherein the first code packet and the second code packet acknowledge the stateful connection;
receiving the second code packet as part of a communications signal;
filtering the second code packet from the communications signal;
comparing a plurality of time differences from receiving a plurality of second code packets to determine a time delay;
transmitting the filtered communications signal to a speaker for conversion to an acoustic signal;
generating, at the first wireless communications device, an audible alert to indicate a potential degradation in the stateful connection, in response to determining, at the first wireless communications device, that the stateful connection has potentially degraded, based on a failure to receive at least one of the plurality of second code packets.

2. The method recited in claim 1 further comprising packaging the first code packet with the communications signal, wherein transmitting the first code packet comprises transmitting the packaged communications signal and first code packet.

3. The method recited in claim 1 comprising sequentially repeating the steps of generating a first code packet, transmitting the first code packet, and determining whether a second code packet is received for a duration of the stateful connection.

4. The method recited in claim 3 wherein the audible alert is generated in response to a failure to receive the at least one of the plurality of second code packets during the sequentially repeating the steps.

5. The method recited in claim 4 wherein generating the audible alert comprises determining a level for the audible alert in accordance with a defined priority state for the stateful connection.

6. The method of claim 5, wherein determining a level for the audible alert in accordance with a defined priority state for the stateful connection comprises setting a first level for the audible alert if it is determined that potential degradation of the stateful connection is outside a first tolerance level and setting a second level for the audible alert if it is determined that potential degradation of the stateful connection is outside a second tolerance level.

7. The method recited in claim 1 wherein:
the first code packet includes a time stamp identifying its time of transmission from the first of the wireless communications devices; and
the second code packet includes a time stamp identifying its time of transmission from the second of the wireless communications devices.

8. The method recited in claim 1 wherein:
each of the first and second of the wireless communications devices is a cellular device; and
transmitting the first code packet comprises transmitting the first code packet over a cellular network.

9. The method recited in claim 8 wherein the cellular device comprises a cellular telephone.

10. The method recited in claim 1 wherein the first and second code packets have lower cutoff frequencies greater than about 4 kHz.

11. A method for monitoring a stateful connection between wireless communications devices, the method comprising:
generating a first code packet at a first of the wireless communications devices, wherein the first code packet has a frequency in a range of 4-8 kHz;
transmitting the first code packet from the first of the wireless communications devices to a second of the wireless communications devices;
determining whether a second code packet generated by the second of the wireless communications devices in response to receipt of the first code packet is received by the first of the wireless communications devices within a predetermined time after transmission of the first code packet from the first of the wireless communications devices, wherein the second code packet has a frequency in the range of 4-8 kHz, wherein the first code packet and the second code packet acknowledge the stateful connection;
comparing a plurality of time differences from receiving a plurality of second code packets to determine a time delay; and
generating, at the first wireless communications device, an audible alert to indicate a potential degradation in the stateful connection, in response to determining, at the first wireless communications device, that the stateful connection has potentially degraded, based on a failure to receive at least one of the plurality of second code packets.

12. A method for monitoring a stateful connection between wireless communications devices, the method comprising:
generating a first code packet at a first of the wireless communications devices, wherein the first code packet has a first upper cutoff frequency less than 4 kHz;
transmitting the first code packet from the first of the wireless communications devices to a second of the wireless communications devices;
determining whether a second code packet generated by the second of the wireless communications devices in response to receipt of the first code packet is received by the first of the wireless communications devices within a predetermined time after transmission of the first code packet from the first of the wireless communications devices, wherein the second code packet has a second upper cutoff frequency less than 4 kHz, wherein the first code packet and the second code packet acknowledge the stateful connection;
comparing a plurality of time differences from receiving a plurality of second code packets to determine a time delay; and
generating, at the first wireless communications device, an audible alert to indicate a potential degradation in the stateful connection, in response to determining, at the first wireless communications device, that the stateful connection has potentially degraded, based on a failure to receive at least one of the plurality of second code packets.

13. A wireless communications device comprising:
a wireless transmitter adapted to convert electrical signals into radiating electromagnetic signals;
a wireless receiver adapted to convert received electromagnetic signals into electrical signals;
a timer adapted to provide a standardized measure of time intervals;
a processor in electrical communication with the wireless transmitter, the wireless receiver, and the timer, the processor comprising:
instructions to generate a first code packet;
instructions to transmit the first code packet from the wireless transmitter to a second wireless communications device;
instructions to determine whether a second code packet generated by the second wireless communications device is received by the wireless receiver within a predetermined time after transmission of the first code packet by correlating time information provided to the processor by the timer, wherein the first code packet and the second code packet acknowledge the stateful connection; and
instructions to compare a plurality of time differences from receiving a plurality of second code packets to determine a time delay; and
a speaker in electrical communication with the processor, the speaker being adapted to convert electrical signals to acoustic signals, wherein:
the instructions to receive the second code packet comprise instructions to receive the second code as part of a communications signal;
the processor further comprises instructions to filter the second code packet from the communications signal;
the processor further comprises instructions to transmit the filtered communications signal to the speaker;
the processor further comprises instructions to generate, with the speaker at the wireless device communication device, an audible alert to indicate a potential degradation in the stateful connection, in response to determining, at the wireless communications device, that the stateful connection has potentially degraded, based on a failure to receive at least one of the plurality of second code packets.

14. The wireless communications device recited in claim 13 wherein:
the processor further comprises instructions to package the first code packet with the communications signal; and
the instructions to transmit the first code packet comprise instructions to transmit the packaged communications signal and first code packet.

15. The wireless communications device recited in claim 13 wherein the processor further comprises instructions for sequentially repeating execution of the instructions to generate the first code packet, the instructions to transmit the first code packet, and the instructions to determine whether the second code packet is received for a duration of a stateful connection between the wireless communications device and the second wireless communications device.

16. The wireless communications device recited in claim 15 wherein the instructions to generate an audible alert with the speaker comprise instructions to generate the audible alert in response to a determination that the at least one of the plurality of second code packets has not been received during sequentially repeating execution of the instructions.

17. The wireless communications device recited in claim 16 wherein the instructions to generate the audible alert comprise instructions to determine a level for the audible alert in accordance with a defined priority state for the stateful connection.

18. The wireless communications device recited in claim 13 wherein:
the instructions to generate the first code packet include instructions to include a time stamp identifying a time of transmission as part of the first code packet from information provided to the processor by the timer; and
the second code packet includes a time stamp identifying its time of transmission from the second of the wireless communications devices.

19. The wireless communications device recited in claim 13 wherein the wireless communications device is a cellular device and the instructions to transmit the first code packet comprise instructions to transmit the first code packet over a cellular network.

20. The wireless communications device recited in claim 13 wherein the first and second code packets have lower cutoff frequencies greater than 4 kHz.

21. A wireless communications device comprising:
a wireless transmitter adapted to convert electrical signals into radiating electromagnetic signals;
a wireless receiver adapted to convert received electromagnetic signals into electrical signals;
a timer adapted to provide a standardized measure of time intervals; and
a processor in electrical communication with the wireless transmitter, the wireless receiver, and the timer, the processor comprising:
instructions to generate a first code packet, wherein the first code packet has a frequency in a range of 4-8 kHz;
instructions to transmit the first code packet from the wireless transmitter to a second wireless communications device;
instructions to determine whether a second code packet generated by the second wireless communications device is received by the wireless receiver within a predetermined time after transmission of the first code packet by correlating time information provided to the processor by the timer, wherein the second code packet has a frequency in the range of 4-8 kHz, wherein the first code packet and the second code packet acknowledge the stateful connection
instructions to compare a plurality of time differences from receiving a plurality of second code packets to determine a time delay; and
instructions to generate, at the wireless communications device, an audible alert to indicate a potential degradation in the stateful connection, an audible alert to indicate a potential degradation in the stateful connection, in response to determining, at the wireless communications device, that the stateful connection has potentially degraded, based on a failure to receive at least one of the plurality of second code packets.

22. A wireless communications device comprising:
a wireless transmitter adapted to convert electrical signals into radiating electromagnetic signals;
a wireless receiver adapted to convert received electromagnetic signals into electrical signals;
a timer adapted to provide a standardized measure of time intervals; and a processor in electrical communication with the wireless transmitter, the wireless receiver, and the timer, the processor comprising:
instructions to generate a first code packet, wherein the first code packet has a first upper cutoff frequency less than 4 kHz;
instructions to transmit the first code packet from the wireless transmitter to a second wireless communications device;
instructions to determine whether a second code packet generated by the second wireless communications device is received by the wireless receiver within a predetermined time after transmission of the first code packet by correlating time information provided to the processor by the timer, wherein the second code packet has a second upper cutoff frequency less than −4 kHz, wherein the first code packet and the second code packet acknowledge the stateful connection;
instructions to compare a plurality of time differences from receiving a plurality of second code packets to determine a time delay; and
instructions to generate, at the wireless communications device, an audible alert to indicate a potential degradation in the stateful connection, in response to determining, at the wireless communications device, that the stateful connection has potentially degraded, based on a failure to receive at least one of the plurality of second code packets.

* * * * *